3,645,893
METHOD OF TREATING ANIMAL WASTE
Ernst Rohrer, Boden, CH–9470 Buchs, Switzerland
No Drawing. Filed Aug. 19, 1969, Ser. No. 851,452
Claims priority, application Switzerland, Aug. 22, 1968, 12,616/68
Int. Cl. C02c 5/02
U.S. Cl. 210—50                              16 Claims

ABSTRACT OF THE DISCLOSURE

The invention relates to a method of treating waste from animal excreta in the form of manurial liquids by precipitating or flocculating the liquid and solid constituents and thereafter separated.

---

The invention relates to a method of treating the waste arising from animal excreta, which may be in the form of manurial liquid, fresh swillings or swillings resembling or containing manure, from stalls, stables, sties and the like.

The annual statistics concerning the poisoning of fish in national waterways show very clearly that most of the mortality among fish is attributable to the discharge of waste water resembling or containing manurial liquid. The contamination of ground water by agricultural liquid waste has likewise long ceased to be unusual.

In addition to a high degree of oxygen deficiency, very dangerous toxic decomposition products of albumen and albuminous compounds are to be found in such wastes. Even when highly diluted, the unpleasant, penetratingly odorous substances are still a source of disturbance and disgust. The bacterial flora represents an acute or at least latent danger to man and beast. Moreover, parasitic infections can be conveyed by waters contaminated in this way.

"Manurial liquid" is the term applied to fluid substances derived from animal excreta by anaerobic decomposition. Its composition differs greatly, according to the stage of decomposition. The kind of animal and how it has been fed, housed and maintained also have a considerable effect on the substances contained in the liquid waste.

Until only a few years ago, there was scarcely any need to process such liquid wastes from stables and so forth, since agriculture was almost without exception keyed to an economy based on liquid and/or solid manures. With the growth of intensive animal breeding and fattening and the rationalisation of stable and stall management, the position has undergone a radical change. Breeding and fattening establishments have come into being which have no land other than their built-over area and can therefore no longer themselves turn their animal wastes to account. The size of such establishments and the fact of their being near to centres of consumption prevent them from storing their own manurial liquids; and transporting these by road to suitable plots of land makes these manures so expensive that such transportation is no longer very attractive. Moreover, no land, whether meadow or arable, can be manured with this material all the time or in the desired quantities. In rationalised stalls and stables that do not use litter, swilling-down gives rise to large quantities of diluted liquid waste, while in establishments with gap-type floors, where some degree of separation occurs between the liquid and solid excreta, there is less liquid, but it is usually more concentrated.

To allow liquid animal waste to enter the drains for purification by the municipal sewage works is not permitted, the liquid constituents being present in such concentrations that they far exceed the levels prescribed in the directive issued by the Swiss Federal Government on Sept. 1, 1966, in addition to which, owning to sediment formation, they constitute a danger to the sewerage system when sent directly to the drains. This ban, however, offers no solution whatever to the problem; on the contrary, each individual establishment has to find its own solution. In this, of course, the question of cost plays an important part. The processing of stall and stable waste can be justified only as long and in as far as it does not make the product, that is to say the animal unit, so dear as to call the financial basis of the breeding or fattening establishment into question.

In any investigation of a proposed method of purification, the prime consideration must be what is required of the treated waste. Thus, for instance, the degree of purity and the amount of residue may well differ widely, according to whether the liquid emerging from the purification plant is to go to a municipal clarifying plant or to be used for spraying fruit, vegetable and other crops or, again, to be discharged into a drainage ditch. As regards percolation, account must be taken of hydrological conditions according to the three-zone classification.

In large undertakings, it has been suggested that all the waste be dried. This is certainly the most satisfactory solution as regards the protection of waterways, as it means the end of the drainage problem. However, it introduces new problems as regards air pollution, since evaporation certainly does not eliminate the smell-producing substances; and to purify the exhalations presents at least as much difficulty as to purify the waste water. The foul gases cannot be freed from odoriferous agents with electrostatic filters; and if they are wet washed, the result is again a heavily charged, and more especially highly toxic, waste water. The vapours can certainly have most of their smell removed by after-burning at over 700° C., but the capital outlay and running costs involved are far too high. The drying process, if it is to comply not only with the requirements of waterway protection, but also with those concerning air pollution, is far too complicated and presents a threat to the economy of even a large undertaking.

The results obtained from what is called the "full oxidation" process, which has been proposed in various quarters, differ widely. The waste liquids are intensively treated with air in single-stage or multi-stage installations, to break down the organic matter. It is perfectly possible to induce oxidation by aerobic micro-organisms, but the time required for this and the construction and running costs involved are a moot point. Waste water treated in this way, even if it contains little or no residue of matter capable of decomposition, may still not be discharged into a drainage ditch, as its content of inorganic manurial substances such as phosphates, for example, is far too high. Such waste water may indeed be used for irrigating agricultural land, but the occasion for this, in our country, arises only during a short period every year. A possibility to consider is drainage into a public clarifying installation with so-called third-stage purification or simultaneous sedimentation, but a connection of this kind usually entails considerable expense, which again makes the financial basis of breeding or fattening problematical.

Experiments have also been made in the use of absorption tanks for waste treatment. In these large reservoirs, protected against leakage, the water is allowed to evaporate partly naturally and partly with the aid of such plants as already exist or others specially selected and cultivated. These plants absorb a lot of water and evaporate it through their leaves. They also extract from the substratum considerable amounts of mineral substances such as phosphorus, magnesium, potassium, calcium and so on. The evaporation of moisture and absorption of nutrients by the plants fluctuate considerably, however, and largely depend, of course, on climate and weather conditions. Moreover, the combination of minerals in such waste satisfies the needs of the plants only in exceptional cases. This method is therefore inherently very uncertain.

The purpose of the present invention is to provide a method, free from the drawbacks described, for processing the waste from stalls, stables and the like, arising from animal excreta.

This can be done, according to the invention, by adding to the animal waste products, at the earliest possible moment, precipitants and/or coagulants, by which at least part of the dispersed substances and the colloidal and truly dissolved constituents is precipitated or flocculated, the liquid and solid constituents being afterwards separated by sedimentation, filtration, flotation and/or centrifuging.

The invention is based on the fact, which has been demonstrated by experiment, that the decomposition of feeding stuffs, which takes place only partially within the digestive tract of an animal, continues automatically in the excreta, especially as regards the solids, according to the prevailing temperature, thereby increasing the concentration of dissolved constituents in the waste. In the pig, for example, 8% to 12% by weight of the original solid droppings may have gone into solution only 12 hours after evacuation. Solids can be easily and very cheaply removed from the water, but it is too late to do the same with what has dissolved. To achieve economical and complete treatment of such waste, therefore, it is most important that it be treated as soon as possible. Once allowed to stand, the waste is difficult and expensive to treat.

As decomposition continues in the manner stated, highly toxic and/or evil-smelling compounds are often formed. The anaerobic decomposition of albumins, by the carboxylation of amino acids, for example, gives rise to the putrefactive toxins cadaverine and putrescine. The poisonous substances skatole and indole are produced by the deamination of aromatic amino acids. Albumins containing sulphur produce sulphuretted hydrogen, and so forth. Decomposition can be effectively delayed by the precipitation of dissolved matter and the flocculation of dispersed colloids such as albumen, polysaccharides etc. These compounds, which in themselves can be readily and quickly decomposed, are partly dehydrated in the course of flocculation and hence, to some extent, decompose less readily. Thus, for example, the waste from pigsties, once the colloids have been suitably flocculated, will keep for up to 10 days without undergoing any noteworthy change.

Precipitation or flocculation may be carried out in a collecting tank or—and this has been found best—while the stalls or the like are being cleaned out, by direct admixture of the precipitant or coagulant to the flushing, swilling or cleaning water. This method ensures the necessary thorough mixing of the additives with the excreta and makes expensive mixing equipment unnecessary. The amounts added can be controlled by the water pressure or the amount of water consumed, by the injector principle, or by means of any other gauging arrangement.

Suitable precipitants and/or coagulants are the activated or normal oxides or salts of iron, magnesium, aluminium, silicon and calcium, as well as those compounds of high and very high molecular weight, having anion, cation or non-ionogen activity, which form colloidal suspensions in water or can readily be soaked therein, such as, for example, carboxylic acids of high molecular weight and the like, which have the property of forming insoluble aggregations or complexes with the colloids in the waste and with such salts and other constituents as already exist or may be added.

In addition to the colloids, it is possible to precipitate in the same way and at the same time, if desired, the truly dissolved compounds and other substances with which the water is charged, such as phosphates, for example. Precipitants and coagulants which have a mutually negativing action must be put in separately, whereas others may be added in the form of mixtures.

Thus, for example, with the waste from pigsties, good precipitation can be achieved by the addition of 1 mg./l. of a polyacrylic acid, 10 mg./l. of iron (III) chloride and/or 50 mg./l. of aluminium sulphate, so that the watery components can readily be separated subsequently from the solids by sedimentation, filtration and/or centrifuging. This liquid phase has very little smell and can be used as it is for watering agricultural land. Its permanganate consumption, regarded as a measure of its oxidisability, is about 600 to 1,000 mg./l., as compared to that of the fresh sty waste, which is 8,500 to 10,000 mg./l.

The solid residues, which form the major portion of the entire charge, can be composted or dried and used as manure. Where filters are used, it is of advantage to employ a filtering medium that can be converted into humus, such as peat, cellulose, sawdust and so forth, or mixtures of these materials.

If the liquid portion is to be discharged directly into a drainage ditch, it is essential to subject it to further treatment beforehand. For this purpose, at least single-stage filtration over special absorption filters has been found satisfactory. For example, filtration over activated charcoal enables a liquid phase of such purity to be obtained that it may be discharged directly into a watercourse. If necessary or desired, this filtration can be still further improved if followed by passage through one or more ion exchangers. This somewhat expensive filtration process may be replaced wholly or in part by chemical oxidation either with chlorine or chlorine compounds, per-compounds, activated and/or ionised gases or mixtures thereof, ozone or ozone-containing air.

The liquid phase of the waste from stalls and the like, when treated in this way, meets all the requirements that a waste water has to fulfil before it may be discharged into a drainage ditch. Moreover, it is hygienically and chemically such that it can be re-used for cleaning out the stalls. The waste water can thus be kept in circulation for long periods without becoming over-charged with salts or other substances. As regards smell, too, there is no objection to such re-use.

This re-circulation has the further advantage that the requisite precipitants and coagulants can be added in excess, so that improved precipitation and flocculation can be achieved without loss of chemicals. This greatly simplifies the problem of dosage rate, because the precipitants and coagulants can also be added intermittently, every three or four days, for example. The amount of water used for flushing and swilling no longer matters when there is re-circulation, since the concentration of contaminants is no longer important.

The circulating system described relieves a breeding or fattening establishment of all waste-water problems and is also very advantageous financially, because of the saving of water and the automatic avoidance of loss of precipitants and coagulants. To this must be added the considerable saving on the constructional work necessitated by the storage of stall refuse. To prevent the over-charging of water in the circulating system, there is advantage in passing the waste water through a washing column or some other equivalent cascade separator, in counterflow to a fairly large volume of a gaseous medium such as air or ionised gases, for example, so that part of the waste water may be separated by that medium and disposed of by being blown off into the atmosphere, for instance. This process is known technically as "stripping." To achieve a good stripping action, steam may well be mixed with the gaseous medium, or some other form of heat energy may be introduced. There need be no fear of unpleasant smells from the gaseous medium blown off, because the liquid has very little odour after separation of the solids, especially if such odoriferous substances as still exist have been oxidised prior to stripping.

EXAMPLE 1

Waste from the stalls of fattening calves is washed by water into a collecting sump and there mixed at once with 80 g. of aluminium sulphate per cu. m. After a reaction lasting between 10 and 15 minutes, the solids have been flocculated, whereupon the material is filtered through a layer of peat 2 cm. to 3 cm. thick. The clear, watery filtrate, which has very little odour, is suitable for spraying fruit and vegetable crops, while the solid residues are composted along with the filtering agent and then used as solid manure.

EXAMPLE 2

Waste from the sties of breeding pigs is swilled out with water in which 20 g. of iron (III) chloride and 10 g. of calcium hydroxide per cu. m. have been dissolved by way of precipitant. With the aid of an injector incorporated in the hose line, a solution of a high polymer polyacrylic acid is also mixed into the water by way of coagulant in such a way as to bring its concentration to 1.5 g./cu. m. of water.

During the swilling, the hose water containing the precipitants and the coagulant is necessarily mixed with the excreta. Precipitation and flocculation begin at once and the liquid phase can be separated from the solids by filtration or centrifuging. The filtrate or centrifuged liquid is suitable for use as a spray on agricultural land. To obtain a waste water that may be discharged into a drainage ditch and hence must meet the requirements of the water conservancy authorities, the filtrate or centrifuged liquid is also subjected to chemical oxidation with hypochloride, so that its potassium permanganate consumption drops accordingly.

EXAMPLE 3

Waste from the sties of bacon pigs is swilled out with water drawn from an elevated tank in a closed-circuit system. Dissolved in this water are 100 g. of iron(III) chloride and 100 g. of aluminum sulphate per cu. m. In the delivery pipe, 1 g. of polyacrylic acid per cu. m. is also added to the water. This water is naturally mixed intensively, in the course of flushing, with the animal excreta, in which it brings about flocculation of all the dispersed and colloidally suspended substances. The phosphates dissolved in the waste are precipitated at the same time. The swillings are separated by filter or centrifuge into their solid and liquid components. The solids are converted in a drier into dry fertiliser, while the liquid is oxidised in a standard washing column with ionised ozone-containing air until the potassium permanganate consumption has dropped to below 100 mg./l. This waste water, which still contains a considerable excess of precipitant and coagulant, is fed back to the high tank and re-used for swilling. The content of precipitant and coagulant is checked periodically and made good when necessary.

The amount of gas admitted to the washing column should be such as to produce a good stripping action, so as to prevent an increase in the volume of liquid during continuous working.

What I claim is:

1. A method for treatment of a liquid-solid system of animal waste products from stalls, stables, sties and the like derived at least partly by cleaning out the stalls or the like with hosing, flushing or swilling water, comprising:

treating said products with a substance capable of causing precipitation of soluble materials in said products or flocculation of suspended or dispersed materials in said products, said treatment being accomplished at the earliest possible time after said products have been eliminated from the animals and prior to the time that substantial decomposition of said products has occurred externally of the animals whereby said materials are solidified and the decomposition rate thereof is decreased, said substance being added to the water used for hosing, flushing or swilling during cleaning of areas where said animals are housed; and thereafter separating said solidified materials from the liquid phase of said products.

2. A method as set forth in claim 1 wherein said treatment is accomplished within twelve hours after said products have been eliminated from the animals.

3. A method as set forth in claim 1 wherein said substance comprises a flocculant and a precipitant.

4. A method as set forth in claim 1 wherein at least part of the substance is introduced into the feed pipe for said water by means of a jet pump.

5. A method as set forth in claim 1 wherein the liquid phase, after being separated from solids, is recirculated for re-use as the hosing, flushing or swilling water.

6. A method as set forth in claim 5 wherein the concentration of said substance in the liquid phase circulated for hosing, flushing or swilling is adjusted to the level necessary for achieving precipitation and flocculation.

7. A method as set forth in claim 5 wherein the liquid phase recirculated is stripped of water by contacting the same with a gaseous medium in a stripping zone.

8. A method as set forth in claim 7 wherein said liquid phase is contacted with steam in said stripping zone.

9. A method as set forth in claim 1 wherein the liquid phase is used directly for watering agricultural land.

10. A method as set forth in claim 1 wherein the liquid phase is discharged directly to a municipal clarifying plant.

11. A method as set forth in claim 1 wherein the liquid phase is subjected to chemical oxidation of its organic constituents and is then discharged into an open watercourse.

12. A method as set forth in claim 11 wherein the oxidation is carried out by a substance selected from the group consisting of chlorine, chlorine compounds, per-compounds, activated and ionized gases or gas mixtures, ozone and ozone-containing gases and gas mixtures.

13. A method as set forth in claim 1 wherein the liquid phase is filtered in an absorption filter, the filtrate then being discharged into an open watercourse.

14. A method as set forth in claim 13 wherein the filtrate is fed through at least one ion exchanger.

15. A method as set forth in claim 1 wherein the solid components are used as manure, either fresh or composted.

16. A method as set forth in claim 15 wherein the liquid phase is separated from the solids by means of at least one filter consisting of organic humus-forming materials selected from the group consisting of sawdust, peat and cellulose.

References Cited

UNITED STATES PATENTS

| | | | |
|---|---|---|---|
| 3,171,802 | 3/1965 | Rice et al. | 210—53 X |
| 1,369,871 | 3/1921 | Zirwas et al. | 210—18 X |
| 2,200,580 | 5/1940 | Pruss et al. | 210—17 |
| 3,356,609 | 12/1967 | Bruemmer | 210—7 |
| 3,408,289 | 10/1968 | Gustafson | 210—37 X |

OTHER REFERENCES

Wheatland, A. B., et al., Treatment of Farm Effluents, Chemistry and Industry, Feb. 29, 1964, pp. 357–360, 361 and 362 (P.O.S.L.).

MICHAEL ROGERS, Primary Examiner

U.S. Cl. X.R.

119—1; 210—52, 60